US012742435B2

(12) United States Patent
Schmidt-Böcking et al.

(10) Patent No.: US 12,742,435 B2
(45) Date of Patent: Sep. 22, 2026

(54) MODULAR UNDERWATER PUMPED-STORAGE POWER PLANT RESERVOIR

(71) Applicant: Horst Schmidt-Böcking, Kelkheim (DE)

(72) Inventors: Horst Schmidt-Böcking, Kelkheim (DE); Luther Gerhard, Saarbrücken (DE)

( * ) Notice: Subject to any disclaimer, the term of this patent is extended or adjusted under 35 U.S.C. 154(b) by 400 days.

(21) Appl. No.: 17/921,815

(22) PCT Filed: Apr. 30, 2021

(86) PCT No.: PCT/EP2021/061424

§ 371 (c)(1),
(2) Date: Oct. 27, 2022

(87) PCT Pub. No.: WO2021/219854

PCT Pub. Date: Nov. 4, 2021

(65) Prior Publication Data

US 2023/0175469 A1 Jun. 8, 2023

(30) Foreign Application Priority Data

Apr. 30, 2020 (DE) ..................... 10 2020 111 844.9

(51) Int. Cl.
*F03B 13/06* (2006.01)

(52) U.S. Cl.
CPC .......... *F03B 13/06* (2013.01); *F05B 2240/40* (2013.01); *F05B 2250/283* (2013.01); *F05B 2250/312* (2013.01); *F05B 2260/422* (2020.08)

(58) Field of Classification Search
CPC .................. F03B 13/06; F05B 2240/40; F05B 2250/283; F05B 2250/312; F05B 2260/422; F05B 2260/42; Y02E 10/20; Y02E 60/16
See application file for complete search history.

(56) References Cited

U.S. PATENT DOCUMENTS

| | | | |
|---|---|---|---|
| 2,593,299 A | 4/1952 | Grumbles | |
| 9,797,366 B2 | 10/2017 | Schmidt-Boecking et al. | |
| 2015/0361948 A1* | 12/2015 | Schmidt-Boecking ... | F03B 3/10 290/54 |

FOREIGN PATENT DOCUMENTS

| | | |
|---|---|---|
| CN | 105927455 A | 9/2016 |
| CN | 108643140 A | 10/2018 |

(Continued)

OTHER PUBLICATIONS

Australian Office Action corresponding to Australian application 2020312166, dated Aug. 15, 2023, 5 pages.

(Continued)

*Primary Examiner* — Joseph Ortega

(74) *Attorney, Agent, or Firm* — Reising Ethington P.C.

(57) ABSTRACT

An underwater pumped storage power plant reservoir in a dry but floodable ground depression, comprises a modular arrangement of several individual pressure vessel modules for the intermediate storage of electrical energy from other power plants, wherein the pressure vessel modules each have an outer wall with at least one flow-through opening for letting in and/or letting out water and can each be filled with water and/or pumped empty independently of one another when the dry ground depression is flooded with water, and wherein the modular arrangement of the pressure vessel modules is designed in such a way that the pressure vessel modules are arranged with respect to one another in the dry ground depression with their outer wall face-to face adjacent to one another.

24 Claims, 11 Drawing Sheets

(56) References Cited

FOREIGN PATENT DOCUMENTS

| | | | |
|---|---|---|---|
| CN | 108867585 | A | 11/2018 |
| CN | 109518665 | A | 3/2019 |
| DE | 19513817 | A1 | 10/1996 |
| DE | 102011013329 | A1 | 9/2012 |
| DE | 102011106040 | A1 | 12/2012 |
| DE | 102011118206 | A1 | 5/2013 |
| DE | 10201400811 | A1 | 5/2014 |
| DE | 102012110662 | A1 | 5/2014 |
| DE | 102013019776 | B3 | 1/2015 |
| DE | 102013020984 | A1 | 6/2015 |
| DE | 202017002559 | U1 | 7/2017 |
| DE | 102019118725 | A1 | 1/2021 |
| DE | 102019118726 | A1 | 1/2021 |
| JP | H1037840 | A | 2/1998 |
| WO | 2012143360 | A1 | 10/2012 |
| WO | 2013117329 | A1 | 8/2013 |
| WO | 2021005016 | A1 | 1/2021 |

OTHER PUBLICATIONS

PCT Written Opinion, PCT Serial No. PCT/EP2021/061424, PCT Filing Date: Apr. 30, 2021, Applicant: Prof. Dr. Schmidt-Bocking, Horst, Dated: Aug. 18, 2021.

PCT Search Report, PCT Serial No. PCT/EP2021/061424, PCT Filing Date: Apr. 30, 2021, Applicant: Prof. Dr. Schmidt-Bocking, Horst, Dated: Aug. 18, 2021.

German Office Action, Serial No. 102020111844.9, Applicant: Schmidt-Bocking, Dated: Mar. 4, 2021.

Int. Search Report, Int. Serial No. PCT/EP2020/069028, Int. Filing Date: Jul. 6, 2020, Applicant: Schmidt-Bocking, Prof. Dr. Horst, Date: Sep. 4, 2020.

Int. Written Opinion, Int. Serial No. PCT/EP2020/069028, Int. Filing Date: Jul. 6, 2020, Applicant: Schmidt-Bocking, Prof. Dr. Horst, Date: Sep. 4, 2020.

German Office Action, Serial No. 10 2019 118 725.7, Owner: Luther, et al., Date: Feb. 2, 2020.

Kraftwerke Linth-Limmern AG, "Zukunft Wasserkraft—Linthal 2015", Apr. 30, 2013, XP055137793, URL:http://www.axpo.com/content/dam/axpo/switzerland/erleben/dokumente/130429_Axpo_Zukunft_Wasserkraft_5Aufl.pdf.

Int. Search Report. Int. Serial No. PCT/EP2019/084491, Int. Filing Date: Dec. 10, 2019, Applicant: Schmidt-Bocking, Prof. Dr. Horst, Date: Feb. 4, 2020.

Int. Written Opinion, Int. Serial No. PCT/EP2019/084491, Int. Filing Date: Dec. 10, 2019, Applicant: Schmidt-Bocking, Prof. Dr. Horst, Date: Feb. 4, 2020.

German Office Action, Serial No. 10 2019 118 726.5, Owner: Luther, et al., Date: Feb. 11, 2020.

Indian Examination Report, Application No. 202237006077, Applicant: Horst Schmidt-Bocking, Dated: Jun. 16, 2022.

English Translation of International Preliminary Report on Patentability, Int. Application No. PCT/EP2021/061424, Int. Filing Date: Apr. 30, 2021, Applicant: Horst Schmidt-Bocking, Date: Nov. 10, 2022.

US Office Action corresponding to U.S. Appl. No. 17/625,853, dated Aug. 27, 2024, 38 pages.

Haugen et al., "How Minnesota's old mining pits could boost wind power"; Nov. 22, 2011; URL: https://energynews.us/2011/11/22/how-mining-pits-could-play-a-role-in-energy-storage/.

US Office Action corresponding to U.S. Appl. No. 17/625,853, dated Feb. 3, 2025, 17 pages.

* cited by examiner

MODULAR UNDERWATER PUMPED-STORAGE POWER PLANT RESERVOIR

TECHNICAL FIELD

The present disclosure relates to a modular reservoir for an underwater pumped storage power plant, in particular for installation in a dry but floodable ground depression, e.g. in an abandoned or still operating open pit mine. The present disclosure is particularly suitable for the subsequent use of the Hambach open pit mine or other lignite mining areas and, if realized in the Rhenish mining area, already has the potential to provide the entire short-term storage capacity required after the energy transition in Germany (and possibly even in Europe).

BACKGROUND OF THE DISCLOSURE

In the context of the energy transition, the aim is to achieve extensive coverage of the power supply by regenerative energy sources, in particular wind energy and photovoltaics. Since wind and sun provide their energy only unsteadily on the earth's surface, short-term storage facilities are required to ensure a continuous supply of energy, which can temporarily store energy and feed it into the power grid during a lull.

DE 10 2011 013 329 A1 discloses the basic idea of constructing a pumped storage power plant under water, wherein a lowered pressure vessel serves as a lower reservoir to store energy when water is pumped out of the pressure vessel and to provide energy when water is let into the pressure vessel.

The construction of an underwater pumped storage power plant in an abandoned or still operating open pit mine before it is flooded is described in DE 10 2019 118 725, which is hereby incorporated by reference. Further, DE 10 2019 118 726, which is also hereby incorporated by reference, teaches a method for the preliminary use of an at least partially constructed lower reservoir for an underwater pumped storage power plant.

GENERAL DESCRIPTION

The present disclosure relates to specify a lower reservoir for an underwater pumped storage power plant, which combines a low manufacturing effort, low costs, a flexible design and expandability with a large storage volume as well as high pressure resistance, stability and safety, and which also permits an environmentally friendly production.

To this end, the present disclosure discloses an underwater pumped storage power plant reservoir in a dry but floodable ground depression, in particular in an abandoned or still operating open pit mine, comprising a modular arrangement of several individual pressure vessel modules.

The individual pressure vessel modules, and thus also the modular arrangement of the several pressure vessel modules as a whole, are used for the intermediate storage of electrical energy from other power plants, in particular wind power plants and/or photovoltaic plants.

When the bottom depression is flooded with water, the pressure vessel modules may preferably be operated such that electrical energy is generated when water is admitted into the pressure vessel modules from the flooded ground depression and electrical energy is stored when water is discharged from the pressure vessel modules into the flooded ground depression.

The pressure vessel modules are each individual modules which may preferably be operated independently of one another, in particular if the modules are each equipped with their own turbine, pump and/or pump turbine at their at least one flow opening. If the pressure vessel modules are independent, this has higher reliability. In the event of an earthquake, at most individual pressure vessel modules are affected, so that only small areas of damage to the reservoir occur. Destruction of the reservoir by an earthquake is thus prevented.

Accordingly, the pressure vessel modules each have an outer wall with at least one flow opening for admitting and/or discharging water, such that the pressure vessel modules can each be filled with water and/or pumped empty independently of one another when the dry bottom depression is flooded with water.

According to the present disclosure, the modular arrangement of the pressure vessel modules is further designed in such a way that the pressure vessel modules are arranged with respect to one another in the dry but floodable ground depression with their outer walls adjacent to each another in a face-to-face manner, in particular without gaps there between.

The pressure vessel modules are arranged next to each other and/or one above the other on the base of the bottom recess. The outer walls of the pressure vessel modules mutually adjoin one another in such a way that the pressure vessel modules each adjoin one another with a flat, i.e. two-dimensional, region of their outer wall and preferably each touch one another with a planar, i.e. two-dimensional, region of their outer wall. The terms face-to-face adjacent or adjoining are to be construed such that the pressure vessel modules are neither merely punctually adjoining nor merely adjoining along a line, i.e. one-dimensionally, as would be the case, for example, if two spherical vessels were adjoining one another or two parallel circular-cylindrical vessels were adjoining one another. Rather, according to the present disclosure, the modular arrangement is characterized by the fact that each pressure vessel module is in contact with an areal part of its outer surface with an areal part of the outer surface of another pressure vessel module.

In general, and in particular due to the dimensions of the pressure vessel modules, which can be e.g. up to several hundred meters, and/or due to thermal expansion of the pressure vessel modules, certain gaps can of course not be excluded. Accordingly, the term face-to-face adjacent within the meaning of this application also includes, in particular, a face-to-face facing of areal areas of the outer walls, whereby a certain gap may remain, which is, for example, smaller than 2%, in particular smaller than 1%, in particular smaller than 0.5%, in particular smaller than 0.1%, in particular smaller than 0.05% of a main dimension of the pressure vessel module. The same also applies to the terms contact or being in contact, the present disclosure comprise a facing with remaining space, which is smaller than the values mentioned. The modular arrangement of the pressure vessel modules is thus designed in such a way that the pressure vessel modules are arranged with their outer walls facing each other in the dry but floodable bottom depression, whereby in each case areal, i.e. two-dimensional, areas of the outer walls face each other, which in particular have a gap which is in particular smaller than the values mentioned.

The stability and mutual cohesion of the modular arrangement is increased by the fact that the pressure vessel modules are arranged in the floor recess adjacent to one another, in particular without gaps. In particular, mutual slippage of the pressure vessel modules is prevented or reduced by the planar contact. Furthermore, the face-to-face contact of the pressure vessel modules reduces the space between them. This in turn can increase the storage capacity of the arrangement and may save on the filling material provided for the gaps. In a preferably gapless arrangement, intermediate spaces can even be avoided altogether. At the points where the pressure vessel modules are in surface contact, the effect of the high external water pressure when the bottom cavity is flooded with water can be prevented. This increases the pressure resistance of the individual pressure vessel modules, especially during a long service life. If necessary, the pressure vessel modules can also be manufactured with a smaller wall thickness and thus at lower cost.

In a preferred embodiment, the pressure vessel modules each define a longitudinal direction such that the outer wall of the pressure vessel modules each has a jacket with an outer jacket surface surrounding the longitudinal direction. Preferably, the pressure vessel modules are arranged in the ground depression in such a way that the longitudinal direction runs vertically and at least some pressure vessel modules arranged directly on the ground stand up with a lower end face on the ground.

Furthermore, the pressure vessel modules are preferably cylindrical at least over a portion along their longitudinal direction in such a way that the outer shell surface has a constant shape in cross section along the portion of the longitudinal direction. The shape, i.e. the outer contour, can in particular be angular or polygonal. The portion is preferably at least 25 percent, particularly preferably at least 50 percent, even more preferably at least 75 percent, of the longitudinal extent of the pressure vessel modules along the longitudinal direction.

In addition, the pressure vessel modules preferably have a constant cross-sectional shape at least over a portion along their longitudinal direction, whereby in particular the entire cross-section comprising the outer contour as well as the inner structure is designed to be constant. The portion is again preferably at least 25 percent, particularly preferably at least 50 percent, even more preferably at least 75 percent, of the longitudinal extent of the pressure vessel modules along the longitudinal direction.

In particular, it can be provided that the pressure vessel modules can be manufactured or are manufactured in a sliding construction at least over a portion along their longitudinal direction, for example with or from concrete. The portion is again preferably at least 25 percent, particularly preferably at least 50 percent, even more preferably at least 75 percent, of the longitudinal extent of the pressure vessel modules along the longitudinal direction.

Preferably, the modular arrangement of the pressure vessel modules is designed in such a way that each pressure vessel module has at least 5 percent, preferably at least 10 percent, more preferably at least 20 percent, even more preferably at least 50 percent of its outer surface, in particular its outer jacket surface, face-to-face adjoining at least one of the other pressure vessel modules.

Preferably, the modular arrangement of the pressure vessel modules is further designed in such a way that at least some of the pressure vessel modules adjoin face-to-face at least one of the other pressure vessel modules with at least 75 percent of their outer surface, in particular their outer jacket surface, and/or at least some pressure vessel modules arranged in the interior of the modular arrangement adjoin other pressure vessel modules with their outer surface, in particular their outer jacket surface, over the entire surface.

The outer surface of the pressure vessel modules, in particular the outer surface of the pressure vessel modules, comprises in particular planar surface sections or consists of planar surface sections. The pressure vessel modules are arranged in such a way that the planar surface sections of a pressure vessel module in each case face-to-face adjoin planar surface sections of other pressure vessel modules. For example, the pressure vessel modules may have, at least in sections, a substantially regularly polygonal cross-section with n corners, in particular a regularly hexagonal cross-section with n=6 corners. The side surfaces may be serrated, such that serrations of adjacent pressure vessel modules interlock, in particular to further stabilize the arrangement.

As already described above, the terms face-to-face adjacent and/or in contact are to be construed in the context of this application such that a certain, in particular negligible, gap can remain. Accordingly, the pressure vessel modules are preferably arranged with their outer wall face-to face adjoining one another in such a way that each pressure vessel module faces with an area of its outer surface an area of the outer surface of at least one of the other pressure vessel modules, in such a way that no gap remains between the opposing areas or a gap remains which is smaller than 2%, in particular smaller than 1%, in particular smaller than 0.5%, in particular smaller than 0.1%, in particular smaller than 0.05%, of a dimension, for example the longitudinal extent, of the pressure vessel module. Alternatively or additionally, the mutually face-to-face part of the outer surface, in particular of the outer surface, of each pressure vessel module and/or the mutually adjoining planar surface sections of the pressure vessel modules, preferably of the outer jacket surface of the pressure vessel modules, can adjoin one another in such a way that no gap remains therebetween or gap remains which is smaller than 2%, in particular smaller than 1%, in particular smaller than 0.5%, in particular smaller than 0.1%, in particular smaller than 0.05%, of a dimension, for example the longitudinal extent, of the pressure vessel module.

A remaining gap may be at least partially filled with a sealing material, in particular at edge regions, to prevent water from penetrating into the gap, the sealing material preferably being designed to be flexible, in particular to bridge thermal expansion and/or temperature fluctuations. For example, the sealing material may comprise rubber. Further, a non-return valve may be incorporated in at least one outer wall of a pressure vessel module to drain water that has entered a gap into the pressure vessel module. A non-return valve may be disposed, for example, in the upper quarter, sixth, eighth, or tenth of the module.

In a preferred modular arrangement, the pressure vessel modules form a regular grid, in particular according to the structure of a hexagonal axis system. In this case, but also independently thereof, it may be provided that the modular arrangement of the pressure vessel modules forms a pressure vessel module layer lying directly on the substrate, in particular without gaps, and preferably also forms one or more upper pressure vessel module layers lying above it, in particular without gaps. If upper pressure vessel module layers are provided, the pressure vessel modules of the upper pressure vessel module layers are preferably arranged in each case without offset above the respective pressure vessel modules of the pressure vessel module layer lying on the ground, and particularly preferably in each case rotated relative thereto by a specific angle, in particular an angle of 360/n degrees, about their longitudinal axis. Rotation by 360/n degrees in the case of a regularly polygonal cross section with n corners may ensure that corners of pressure vessel modules arranged one above the other remain congruent in each case.

In principle, the underwater pumped storage power plant reservoir comprises several, in particular a plurality, of individual pressure vessel modules in modular arrangement. In particular, at least 3 pressure vessel modules are included, preferably at least 10 pressure vessel modules are included, particularly preferably at least 50 pressure vessel modules are included, even more preferably at least 100 pressure vessel modules are included. The individual pressure vessel modules are preferably of identical design. This allows manufacturing costs to be reduced, in particular if the pressure vessel modules are manufactured or can be manufactured in sliding construction.

Inside the pressure vessel modules there is at least one cavity surrounded by the outer wall, which forms the storage volume. Furthermore, the pressure vessel modules preferably have a pressure guide structure in the interior in order to ensure or increase the pressure resistance of the vessels to the water pressure acting on the pressure vessel modules from the outside.

The pressure guide structure is preferably formed monolithically with the outer wall, in particular produced or producible in one casting with the outer wall. The pressure guide structure may comprise struts that connect the inner surfaces of the outer wall to one another. Alternatively or additionally, the pressure conducting structure may comprise arcuate or round-shaped surface portions of the inner surface of the outer wall. In one example, the pressure guide structure may comprise approximately circular cylindrical inner surfaces that can dissipate pressure due to their roundness.

In a preferred embodiment, the pressure vessel modules may comprise, in particular in a cross section, a plurality of cavities with wall elements located therebetween. The cavities are preferably cylindrical and particularly preferably run along the longitudinal direction of the pressure vessel modules. It may be provided that the wall elements located between the cavities form or contribute to the pressure conduction structure. In one example, the wall elements located between the cavities may be honeycomb-shaped, in particular in a cross-section.

In the case where a plurality of, in particular cylindrical, cavities is provided, the cavities may be arranged in such a way that, in particular in a cross-section, a regular grid is formed, in particular according to the structure of a hexagonal axis system. For example, the cavities may be arranged such that a plurality of outer cavities adjacent to the outer wall annularly surround one or more inner cavities. In other words, there may be, for example, an innermost cavity annularly surrounded by further cavities, which further cavities may in turn be annularly surrounded by yet further cavities.

In particular with a view to manufacturing the pressure vessel modules with a high degree of stability while at the same time requiring little material, the aforementioned struts connecting the inner surfaces of the outer wall and/or the aforementioned wall sections located between inner cavities can be thinner than the outer wall of the pressure vessel modules. Furthermore, the struts and/or wall sections between inner cavities may also be thinner than wall sections located between outer cavities.

In the case where several cavities are provided, these are preferably connected to each other via a connecting channel or channels, in particular on the underside of the pressure vessel modules, to form a common pressure storage volume. This makes it possible to operate the pressure vessel module with a single turbine, pump and/or pump turbine.

If several cavities are provided, in particular in a hexagonal arrangement, one of the cavities, in particular a cavity arranged in a corner of a pressure vessel module of substantially regular polygonal shape in cross-section, can be opened outwardly, in particular upwardly, to form the flow opening for admitting and/or discharging water. This cavity forming the flow opening preferably has a thicker wall thickness than the other cavities.

The pressure vessel modules disposed in the bottom cavity are preferably each equipped with a turbine, pump, and/or pump turbine at its flow opening so that, when the dry bottom cavity is flooded with water, the underwater pumped storage power plant reservoir can be operated such that electrical energy is generated when water is admitted from the flooded ground depression into the pressure vessel modules and electrical energy is stored when water is discharged from the pressure vessel modules into the flooded ground depression.

The turbine, pump and/or pump turbine can be arranged inside the cavity forming the flow opening, in particular formed with thicker walls, particularly preferably at its lower end, the connecting channel or channels of the cavities preferably still running below the turbine, pump and/or pump turbine.

The present disclosure further relates to an underwater pumped storage power plant in a flooded ground depression, in particular a sea, a lake or an artificial lake, comprising an underwater pumped storage power plant reservoir at the bottom of the bottom depression, wherein the underwater pumped storage power plant reservoir is formed in particular as described above.

In other words, the underwater pumped storage power plant arranged in a water-filled ground depression preferably comprises an underwater pumped storage power plant reservoir with a modular arrangement of several individual pressure vessel modules for the intermediate storage of electrical energy from other power plants, in particular wind power plants and/or photovoltaic plants, wherein the pressure vessel modules each have an outer wall with at least one flow opening for letting in and/or letting out water, in such a way that the pressure vessel modules can each be filled with water and/or pumped empty independently of one another when the dry ground depression is flooded with water, and the modular arrangement of the pressure vessel modules being configured in such a way that the pressure vessel modules are arranged with respect to one another in the dry but floodable ground depression with their outer wall face-to-face adjacent to one another, in particular without gaps.

The present disclosure further relates to a pressure vessel module, for modular arrangement in a dry but floodable ground depression and/or for lowering in an already flooded ground depression, in particular for the construction of an underwater pumped storage power plant reservoir and/or an underwater pumped storage power plant according to the foregoing. Accordingly, the pressure vessel module described below may in particular comprise one or more of the features mentioned in connection with the subsea pumped storage power plant reservoir.

The pressure vessel module has at least one flow opening for admitting and/or discharging water, such that the pressure vessel module may be filled with water and/or pumped empty when the dry bottom depression is flooded with water.

The pressure vessel module is preferably shaped in such a way that the outer wall of the pressure vessel module can be arranged in a face-to-face adjacent manner to one or more further pressure vessel modules of identical construction, preferably without gaps.

Accordingly, the pressure vessel module is shaped in such a way that the pressure vessel module can adjoin, preferably touch, another pressure vessel module of the same design with a areal, i.e. two-dimensional, region of its outer wall. For the purposes of this application, the terms face-to-face adjoining or touching are to be construed such that the pressure vessel module not merely adjoins another structurally identical pressure vessel module merely punctually or merely along a line, i.e. one-dimensionally, as would be the case, for example, if two spherical vessels adjoined one another or two parallel circular-cylindrical vessels adjoined one another. Rather, the pressure vessel module is characterized in that it can be brought with a areal part of its outer surface into contact with a areal part of the outer surface of a further, identically constructed pressure vessel module.

In a preferred embodiment, the pressure vessel module defines a longitudinal direction such that the outer wall of the pressure vessel module has a jacket surrounding the longitudinal direction with an outer jacket surface.

Furthermore, the pressure vessel module is preferably cylindrical at least over a portion along its longitudinal direction in such a way that the outer jacket surface has a constant cross-sectional shape, in particular angular or polygonal, along the portion of the longitudinal direction. The portion is preferably at least 25 percent, particularly preferably at least 50 percent, even more preferably at least 75 percent, of the longitudinal extent of the pressure vessel modules along the longitudinal direction.

In addition, the pressure vessel module preferably has a constant cross-sectional shape at least over a portion along its longitudinal direction and/or can be manufactured or is manufactured in a sliding design at least over a portion along its longitudinal direction. The portion is again preferably at least 25 percent, particularly preferably at least 50 percent, even more preferably at least 75 percent, of the longitudinal extent of the pressure vessel module along the longitudinal direction.

The outer surface of the pressure vessel module, in particular the shell surface of the pressure vessel module, comprises in particular planar surface sections or consists of planar surface sections. For example, the pressure vessel module may have, at least in sections, a substantially regularly polygonal cross-section with n corners, in particular a regularly hexagonal cross-section with n=6 corners.

In the interior, the pressure vessel module preferably has a pressure guide structure, in particular formed monolithically with the outer wall. The pressure guide structure preferably comprises struts connecting the inner surfaces of the outer wall and/or arcuately or roundly shaped surface sections of the inner surface of the outer wall.

In a preferred embodiment, the pressure vessel module may comprise, in particular in a cross section, a plurality of cavities with wall elements located therebetween. The cavities are preferably cylindrical and particularly preferably run along the longitudinal direction of the pressure vessel module. Here, it may be provided that the wall elements located between the cavities form or contribute to the pressure conduction structure. The wall elements can be honeycomb-shaped, for example.

In the case where a plurality of cavities, in particular cylindrical cavities, are provided, the cavities may be arranged in such a way that, in particular in a cross-section, a regular grid is formed, in particular according to the structure of a hexagonal axis system, wherein preferably a plurality of outer cavities adjacent to the outer wall annularly surround one or more inner cavities.

The aforementioned struts connecting the inner surfaces of the outer wall and/or the aforementioned wall elements located between inner cavities may be thinner than wall sections located between outer cavities and/or thinner than the outer wall of the pressure vessel module.

In the case where multiple cavities are provided, they are preferably interconnected via a connecting channel or channels, particularly on the underside of the pressure vessel module.

If several cavities are provided, in particular in a hexagonal arrangement, one of the cavities, in particular a cavity arranged in a corner of a pressure vessel module of substantially regular polygonal shape in cross-section, may be open outwardly, in particular upwardly, to form the flow opening for admitting and/or discharging water. This cavity forming the flow opening preferably has a thicker wall thickness than the other cavities.

The pressure vessel module is preferably equipped with a turbine, pump, and/or pump turbine at its flow opening so that when the dry ground depression is flooded with water, the pressure vessel module can be operated such that electrical energy is generated when water is admitted into the pressure vessel module from the flooded ground depression and electrical energy is stored when water is discharged from the pressure vessel module into the flooded ground depression.

The turbine, pump and/or pump turbine can be arranged inside the cavity forming the flow opening, particularly preferably at its lower end, with the connecting channel or channels of the cavities preferably still running below the turbine, pump and/or pump turbine.

The pressure vessel module may be designed to be stackable, in particular in such a way that it can be placed on another, in particular identical, pressure vessel module from above. For this purpose, the pressure vessel module may have an at least partially planar upper side and/or an at least partially planar lower side. Preferably, the pressure vessel module has such a symmetry that it can be placed on an underlying, in particular identical, pressure vessel module rotated through a certain angle, in particular an angle of 360/n degrees, where n denotes the number of corners of an essentially regularly polygonal cross section of the pressure vessel module.

In one embodiment, the dead weight of the pressure vessel module may be large enough that the pressure vessel module does not float. On the other hand, in another embodiment, the pressure vessel module may be floatable. A floatable module may be lowerable such that it can be placed on top of another pressure vessel module already located at the bottom of a flooded ground depression.

It may be provided that a pressure vessel module is anchored to the ground and/or weighted to compensate for buoyancy. The outer shape of the pressure vessel module may preferably be designed in such a way that no buoyancy forces can act on its side. In particular, the pressure vessel module may have a cylindrical shape such that the outer jacket surface facing the side is vertical. At the same time or independently of this, drainage can also be provided underneath a pressure vessel module in the ground depression, in particular in order to reduce or prevent a buoyancy force acting on the underside of the module by pumping off water in the subsoil.

In the following, the present disclosure will be explained in more detail by means of embodiment examples and with reference to the figures, wherein the same and similar elements are partially provided with the same reference signs and the features of the various embodiment examples may be combined with each other. Showing:

DETAILED DESCRIPTION

Figure 1:
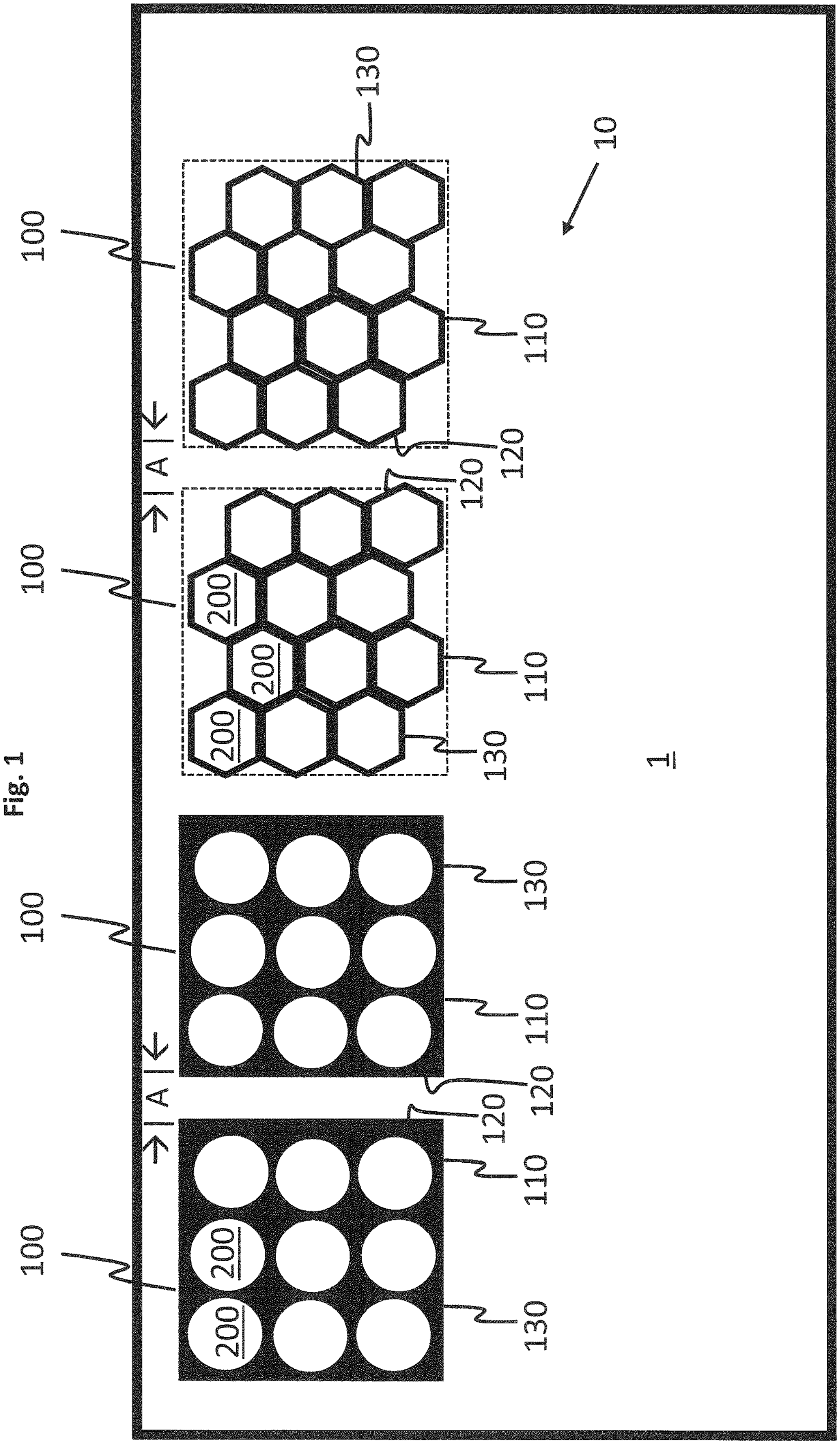
FIG. 1 is a top view of a sectional view of an underwater pumped storage power plant reservoir in a ground depression.

FIG. 1 schematically illustrates the modular structure of a reservoir 10 for a underwater pumped storage power plant (UW-PSPP). A number of individual pressure vessel modules 100 are arranged side by side in the dry-lying ground depression 1 to form the UW-PSPP reservoir 10. For clarity, a distance A is drawn between the pressure vessel modules and the two modules on the right are bordered with a dashed line. However, the modules 100 may actually be arranged such that the spacing A substantially disappears so that the pressure vessel modules are adjacent or in surface contact with each other.

In particular, the bottom depression 1 is an open pit mine not yet flooded in which a UW-PSPP is built up in a modular way. The UW-PSPP reservoir 10, which forms an overall cavity system, may have a length of up to 4 km and a width of 1 km in the Hambach open pit mine, for example. The individual modules 100, which may also be referred to as segments, may have an exemplary size of up to 300 m edge length or diameter and approximately 100 to 250 m height. These sizes are, of course, to be understood as exemplary only. The reservoir 10 and/or the modules 100 may also have other dimensions.

The reservoir 10 includes a plurality of pressure vessel modules 100, at least some of which may be of identical construction, for example, in FIG. 1, the two left-hand pressure vessel modules and the two right-hand pressure vessel modules. Regardless, a pressure vessel module 100 has an outer wall 110 surrounding one or more inner cavities 200 that serve as a pressure storage volume. Further, each module 100 has a flow opening 150 for admitting and/or discharging water into and/or out of the cavities 200 (see FIG. 7 *ff*). The modules 100 arranged in the ground depression 1 mutually adjoin each other with at least a part of their outer wall 110. In the example shown in FIG. 1, both the two left-hand pressure vessel modules 100 and the two right-hand pressure vessel modules 100 are each positioned opposite one another with mutually facing planar surface sections 120 of the outer wall 110, and in particular abut one another when there is no distance A between the modules 100.

The pressure vessel modules 100 shown in FIG. 1 in section from above each define a longitudinal direction 102, which here runs vertically in the plane of the image and/or to the base of the ground depression 1 (for the longitudinal direction 102, see also FIG. 7*ff*). Annularly around the longitudinal direction, the pressure vessel modules 100 have an outer jacket surface 130 which in each case comprises a plurality of planar surface sections 120 or is composed of such, wherein the outer jacket surface 130 in cross-section, as can be seen in FIG. 1, can be formed, for example, as a polygon which, in particular along the longitudinal direction 102, remains at least in sections identical in shape and/or congruent.

A jacket or cross-section that remains constant along the longitudinal direction 102, at least in sections (see also FIGS. 5, 6), allows in particular a cost-effective production of the pressure vessel modules 100 in sliding construction. In other words, a simple slip-form can be used to manufacture an entire module or at least sections thereof. Moreover, the slip-form can be reused. This allows a cost-effective production of several identical modules 100. With one formwork, a plurality of modules can be produced in succession.

Along the longitudinal direction 102, the pressure vessel modules 100 have a longitudinal extent that need not be the longest extent of the pressure vessel modules 100. Rather, the longitudinal direction 102 of the pressure vessel module 100 may be characterized by the module 100 being at least partially cylindrical along this direction, i.e., having a constant outer contour, and/or having a constant cross-section along this direction. Furthermore, the longitudinal direction 102 of the pressure vessel module 100 can also be characterized in that elongated cavities 200 extend along this direction in the interior of the pressure vessel module and/or in that the pressure vessel modules 100 are designed to be set down vertically along this direction.

Figure 2:
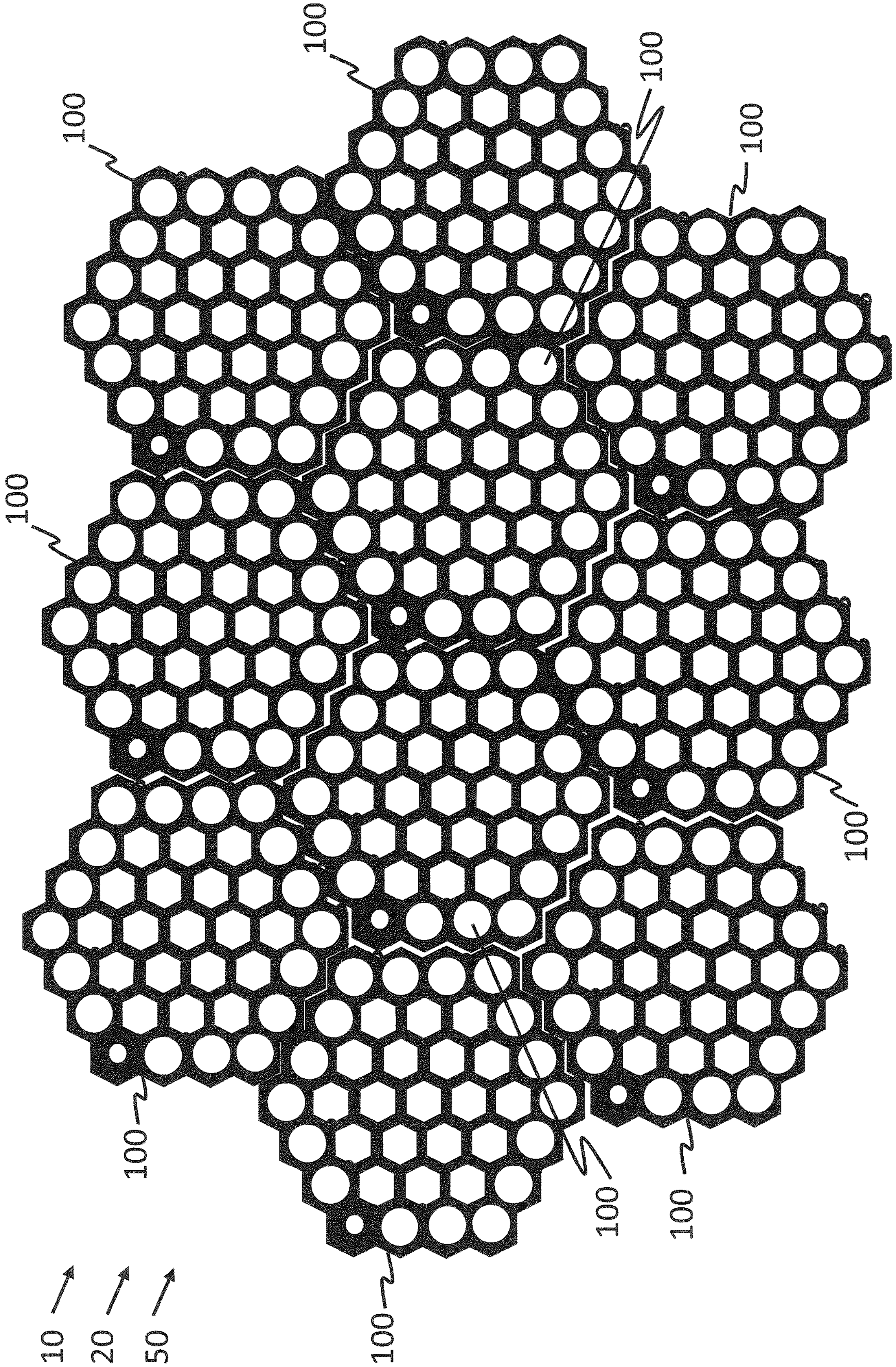
FIG. 2 is a top view of an underwater pumped storage power plant reservoir shown in section with ten pressure vessel modules.

FIG. 2 shows a UW-PSPP reservoir 10 with a plurality of pressure vessel modules 100 adjacent to each other in a planar manner, which form a pressure vessel module group 20. The pressure vessel modules 100 are again shown in section from above and have, at least in sections along the longitudinal direction, a symmetrical geometry, e.g. a substantially polygonal cross-section (here n=6 corners). The side surfaces are serrated and the serrations of adjacent side surfaces of adjacent modules 100 interlock. The pressure vessel modules 100 are arranged in a regular pattern (hexagonal in this case) and form an uninterrupted pressure vessel module layer 50, which may be arranged directly on the subsoil of an open pit, for example. Above the pressure vessel module layer 50, one or more further upper pressure vessel module layers may be arranged.

Figure 3:
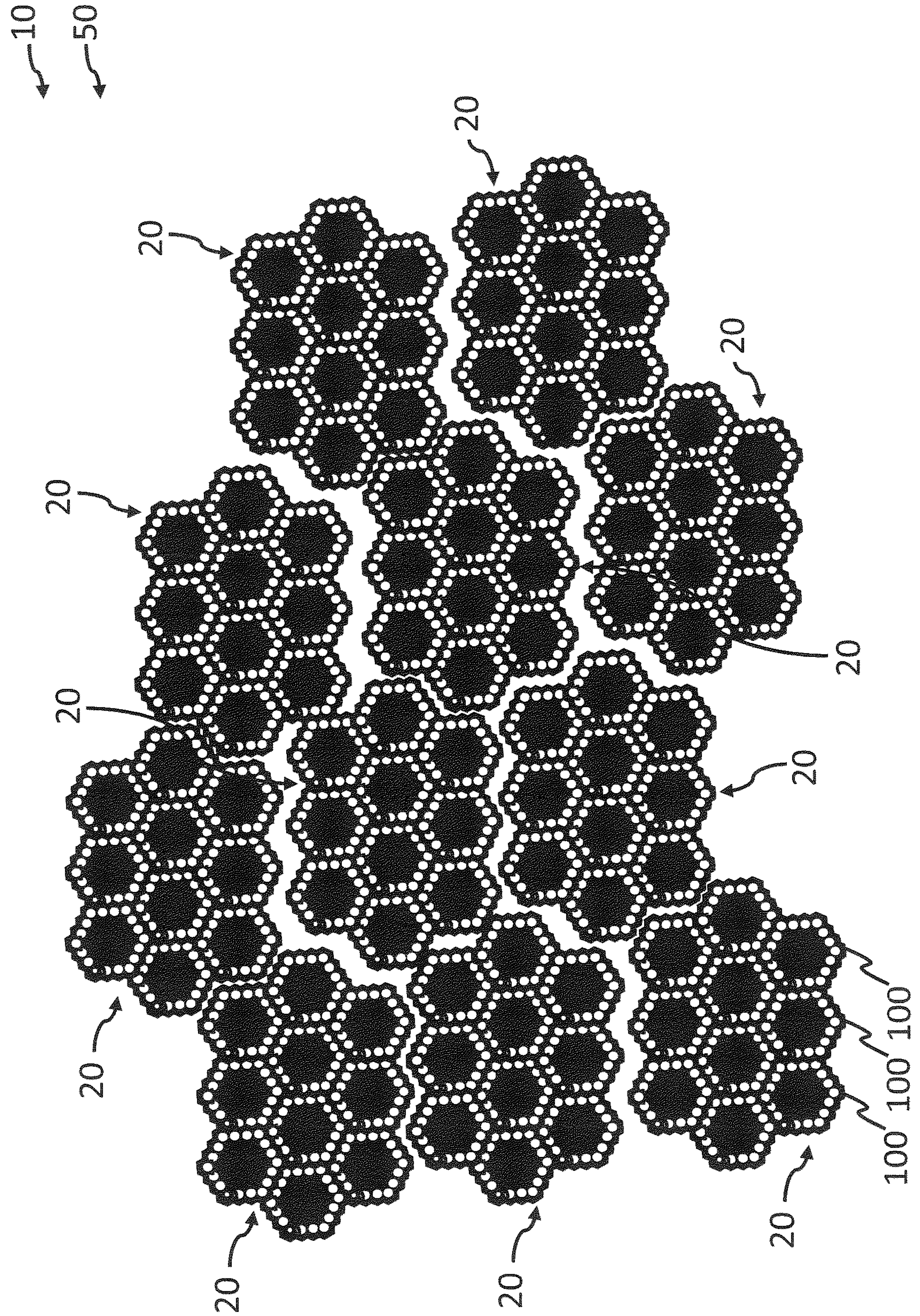
FIG. 3 is a top view of an underwater pumped storage power plant reservoir shown in section with eleven pressure vessel module groups.

FIG. 3 shows another UW-PSPP reservoir 10 with a pressure vessel module layer 50, which in this case comprises a plurality of pressure vessel module groups 20, which in turn comprise a plurality of pressure vessel modules 100 (as shown in FIG. 2). The pressure vessel module groups 20 are again arranged in a regular manner and can be positioned adjacent to each other in a face-to-face manner such that a gapless pressure vessel module layer 50 is formed, on which one or more further upper pressure vessel module layers 50 can be arranged if necessary.

Figure 4A:
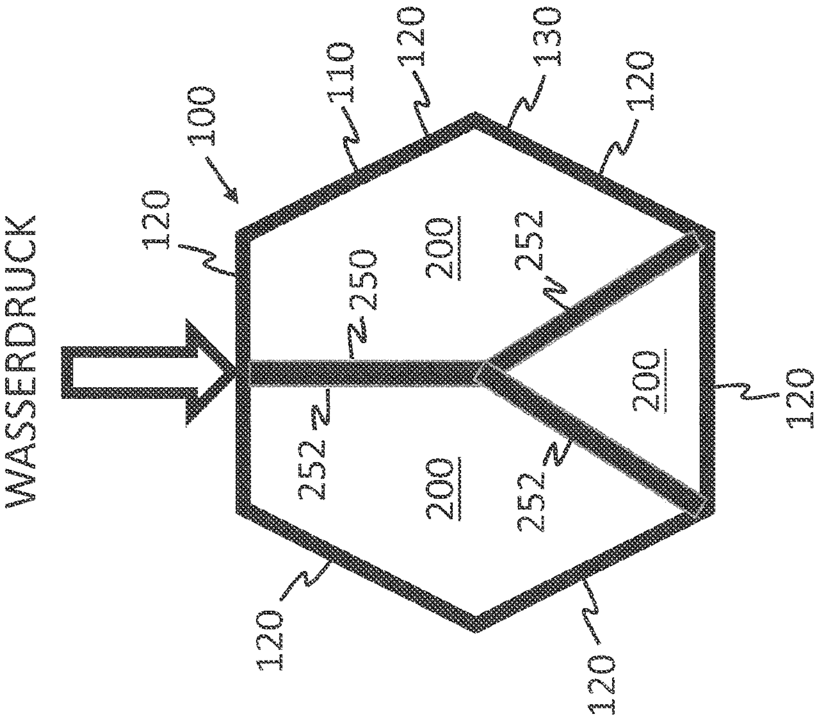
FIG. 4*a* is a top view of a pressure vessel module shown in section with a pressure guide structure with struts.
Figure 4B:
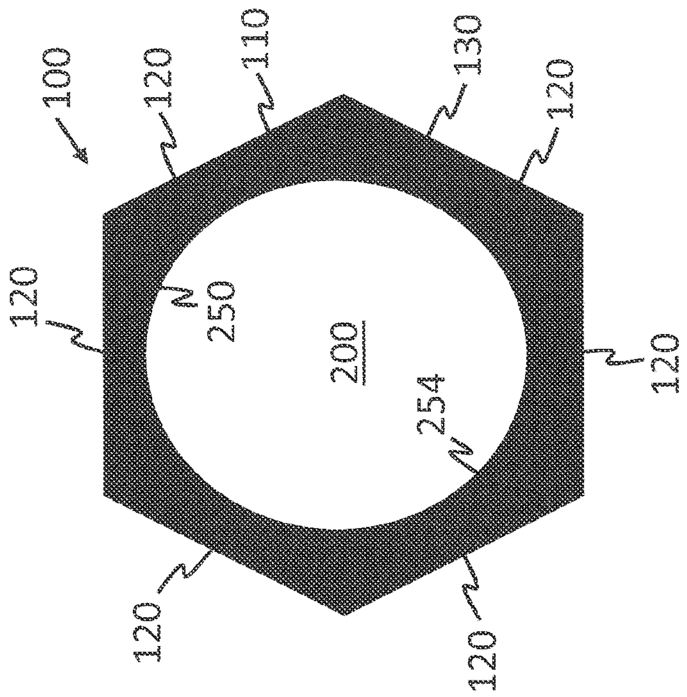
FIG. 4*b* is a top view of a pressure vessel module shown in section with a pressure guide structure with round inner walls.

FIG. 4 shows two pressure vessel modules 100 which have a hexagonal shape in cross-section and whose outer jacket surface 130 comprises six planar surface sections 120 in hexagonal shape. The pressure vessel modules 100 have a pressure guide structure 250 on the inside. In particular, the pressure guide structure may be integrally formed with the outer wall 110 of the pressure vessel modules 100, namely, for example, may be manufactured together with the outer wall 110 in a sliding construction. The module 100 shown in FIG. 4*a* has struts 252 (which can also be formed as prefabricated parts), which dissipate the water pressure acting on the outer wall 110 (shown here as an arrow) and thus increase the pressure resistance of the pressure vessel module 100. For this purpose, the module 100 shown in FIG. 4*b* has an outer wall 110 with a round shaped inner surface 254.

Figure 5:
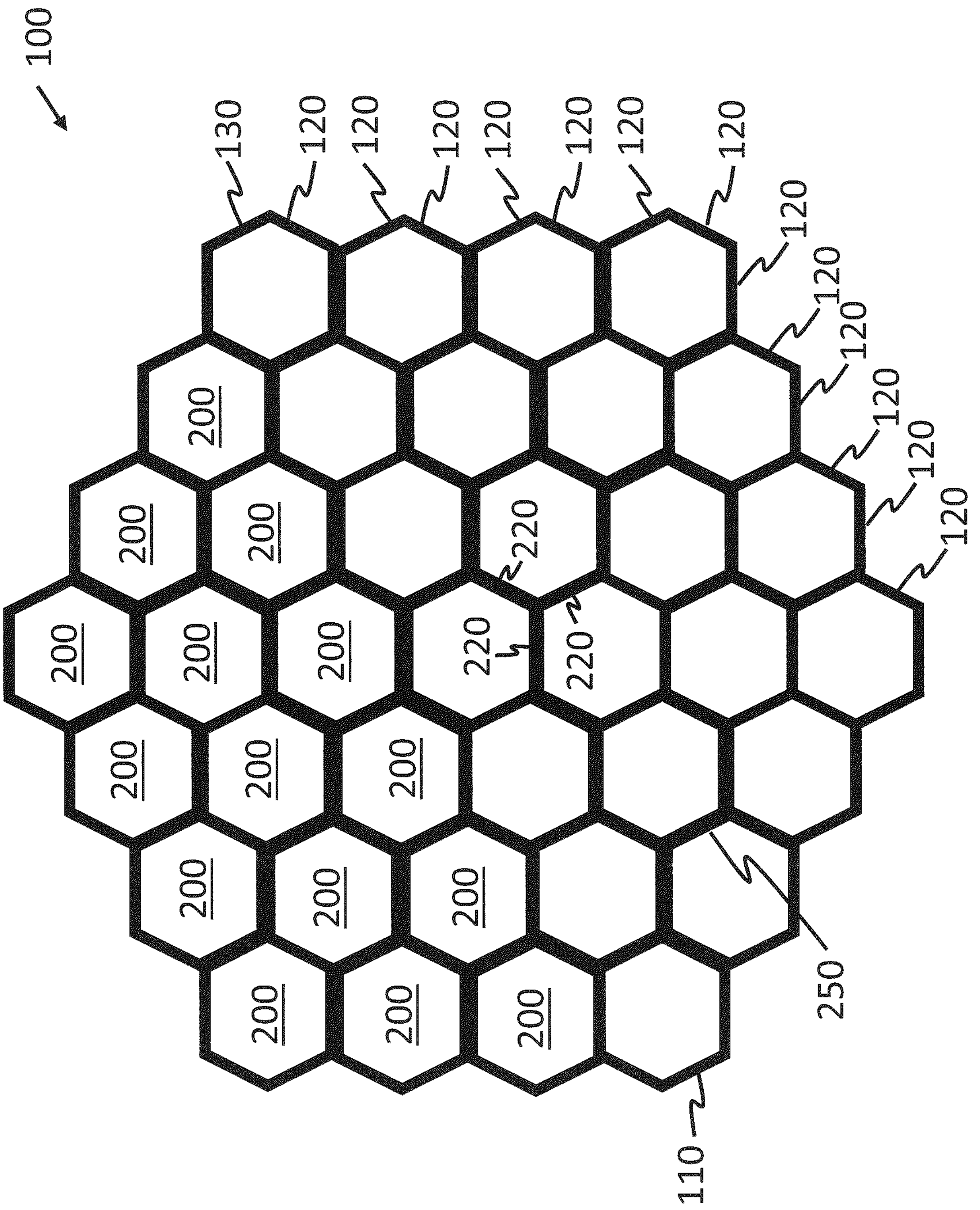
FIG. 5 is a top view of a pressure vessel module shown in section with a plurality of cavities with wall elements contributing to the pressure guide structure.

FIG. 5 shows another pressure vessel module 100 which has a substantially hexagonal shape in cross-section with n=6 corners, wherein the outer jacket surface 130 comprises six sides each having a plurality of planar surface portions 120. The pressure vessel module 100 has a plurality of regularly arranged cavities 200, wherein wall elements 220 are located between the cavities 200, which form a pressure conduction structure 250, which in this case has a honeycomb shape.

The cavities 200 are cylindrical in shape and extend along the longitudinal direction 102 of the pressure vessel module 100. In other words, the module 100 comprises, or consists of, a group of upright (or possibly horizontal) cylindrical or cylinder-like hollow bodies, the hollow bodies together forming a manufacturing unit. In the example shown, the module 100 has 37 cylindrical tubes (or cavities 200). Depending on the diameter of the individual tubes (or cavities 200), their number can be increased or decreased (e.g., hexagonal shapes with 13, or 19, or 25 or more tubes can also be selected), wherein preferably an inner cavity is annularly surrounded by further cavities, in particular such that a pressure vessel module with essentially polygonal geometry is formed. The cylinder-like hollow bodies (or the cavities 200 and wall elements 220 located between them) have, in particular, symmetrical shapes in order to achieve a modular structure with the largest possible internal cavity for water and to optimally distribute the pressure forces (water pressure) acting on the module over the entire module group. These cylinder-like hollow bodies (or cavities 200) can have tube-like, honeycomb-like or other polygon-like shapes.

Figure 6:
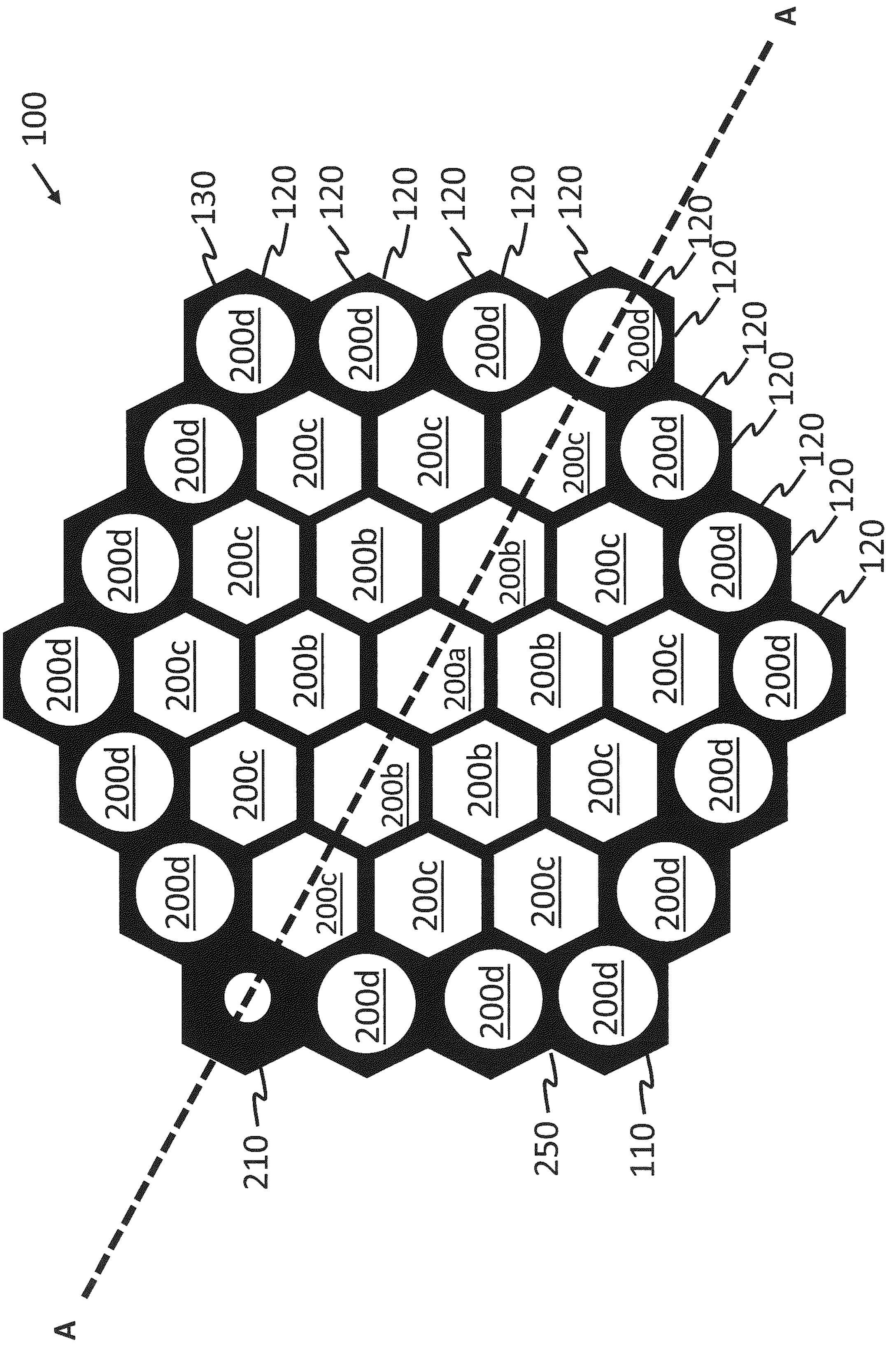
FIG. 6 is a top view of a pressure vessel module shown in section with a plurality of cavities with wall elements of different thicknesses.

FIG. 6 shows another pressure vessel module 100 which, in cross-section, comprises a substantially polygonal shape with serrated side walls having planar surface portions 120. As in FIG. 5, the cavities 200 are again tubular in shape. However, unlike the module shown in FIG. 5, this module 100 has cavities 200 of different shapes or wall elements 220 of different thicknesses. Thus, thinner wall elements 220 are located between cavities 200 that are arranged in the interior (cavities 200*a*, 200*b*, 200*c*) than between cavities that are adjacent to the outer wall 110 (cavities 200*d*). This is because there is no pressure differential between the inner cavities (or tubes), so the wall elements 220 between these inner cavities can be relatively thin. In contrast, the wall elements 200, which are located between the outer cavities 200*d*, are thicker because they may have to withstand the external pressure. Moreover, it can be seen that the externally arranged cavities 200*d*, which are tubular in shape, additionally contribute to the pressure conduction structure 250 by having a round-shaped inner surface. In other words, the cavities 200*d* may have round symmetry on the inside and their walls may be reinforced accordingly (corresponding to the single cavity in FIG. 4*b*) or they may have internal struts 252 (corresponding to FIG. 4*a*). This allows in each case the external pressure to be transmitted symmetrically to the internal wall elements or tubes. The inner struts can be monolithically formed with the outer wall, in particular in the case of the sliding formwork, or can also be formed as prefabricated parts, for example.

By reducing the cavities or the tube diameters and correspondingly increasing the number of tubes or wall elements for a module 100, the compressive strength can be increased so that the thickness of the walls in the outer area can be reduced. In particular, the module 100 can have a honeycomb-like structure; in the example shown, it comprises 37 cylindrical tubes, although if the diameters of the individual tubes are reduced, these numbers can be increased in accordance with the tube symmetry (e.g. honeycomb).

In order to prevent a pressure difference from occurring even in the event of a malfunction, connecting holes can still be provided in the wall elements between the cavities 200 and 200*a*-200*d*, respectively, through which pressure equalization between the cavities 200*a*-200*d* is possible.

The cavity 210, which is preferably arranged in a corner, has a thicker wall. As will be described in more detail below, this cavity 210 is open to the outside and forms the flow opening 150 from the outside to the inside of the module 100. This cavity 210, which in turn may be tubular, is therefore exposed from the inside to the high water pressure at the bottom of the ground depression (up to 45 bar in the Hambach open pit mine). This cavity, which forms the flow opening, can be appropriately reinforced, for example by carbon filaments, iron, special concrete, etc. The cavity can also be reinforced by a special concrete layer.

Figure 7:
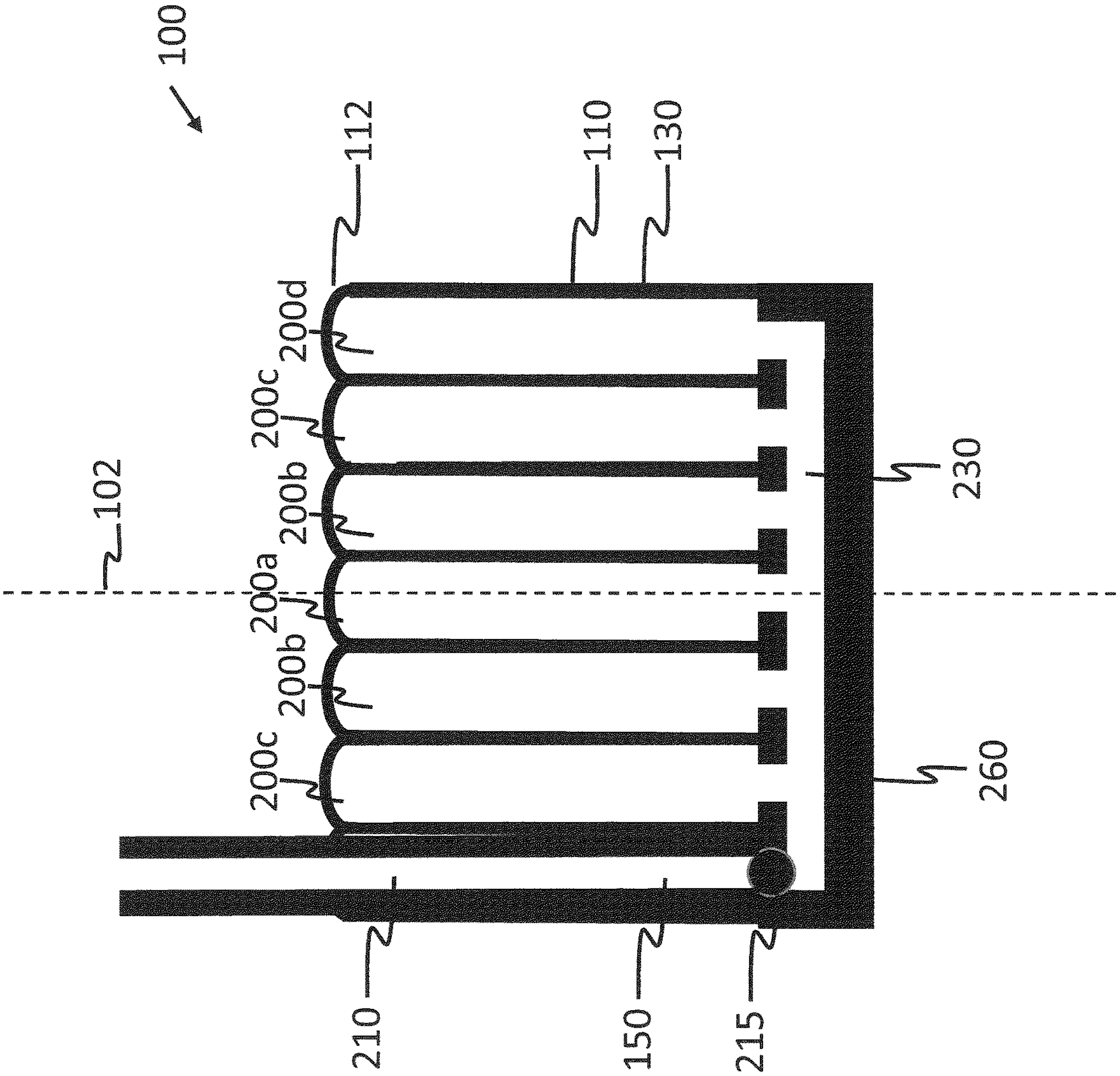
FIG. 7 is a side view of a pressure vessel module shown in A-A section.

FIG. 7 shows the pressure vessel module 100 shown in FIG. 6 in A-A section (cf. FIG. 6). As can be seen, the cavities 200 (200*a*-200*d*) and 210 are cylindrical in shape and extend along the longitudinal direction 102 of the module 100. At the top of the end face, the outer wall 110 of the pressure vessel module 100 comprises terminations 112 formed as lids, which serve in particular as terminations of the tubular cavities. The terminations (lids 112) at the upper end of the tubes may be formed as a dome, e.g. in Romanesque or Gothic shape, etc., to withstand the water pressure. The diameters of the tubes can be calculated accordingly.

The cavities 200 (200*a*-200*d*) are connected to each other via one or more connecting channels 230, in particular at the lower end of the module 100 (low pressure side). This water-wise connection on the low pressure side allows the module 100 to be operated by a single pump turbine 215. The reinforced cavity 210 connects the upper reservoir (upper lake, flooded bottom well) to the pump turbine 215. The pump turbine 215 is preferably located at the lower end of the cavity 210. This allows the high water pressure (proportional to water depth) existing at the lower end of the tube 210 to drive the turbine and generate power as the water flows into the tubes 200*a*-200*d*. To store energy, the water in tubes 200*a*-200*d* is pumped out by the pump against the high water pressure and virtually lifted to the surface of the upper reservoir (upper lake, flooded bottom cavity).

Because the water flow and pump turbines 215 are separate from other pressure vessel modules 100, each module 100 can be operated independently in an arrangement consisting of multiple modules 100.

The pump turbine 215 may be mounted at the bottom of each of the upwardly open tubular cavities 210. For mounting, they can be lowered through the tubes 210 on a steel cable and precisely mounted on the suction surface using a robot (or similar). As the water is pumped out of the tubes 200*a*-200*d*, negative pressure is created internally and the pump turbine 215 is pressed extremely tightly against the intake surface, allowing it to begin its regular operation. If the pump turbine 215 is to be serviced, the tubes can be filled with water and thus equal pressure can be achieved on the inside and outside of the pump turbine 215, so that the pump turbine 215 can be brought back to the water surface with the steel rope and serviced there (servicing the pump turbine by pulling the pump turbine up to the water surface). When assembled, the pump turbine 215 is connected to the outside world by a power cable. Preferably, a valve 216 is provided to disconnect the water connection (not shown in FIG. 7, see FIG. 8).

Figure 8:
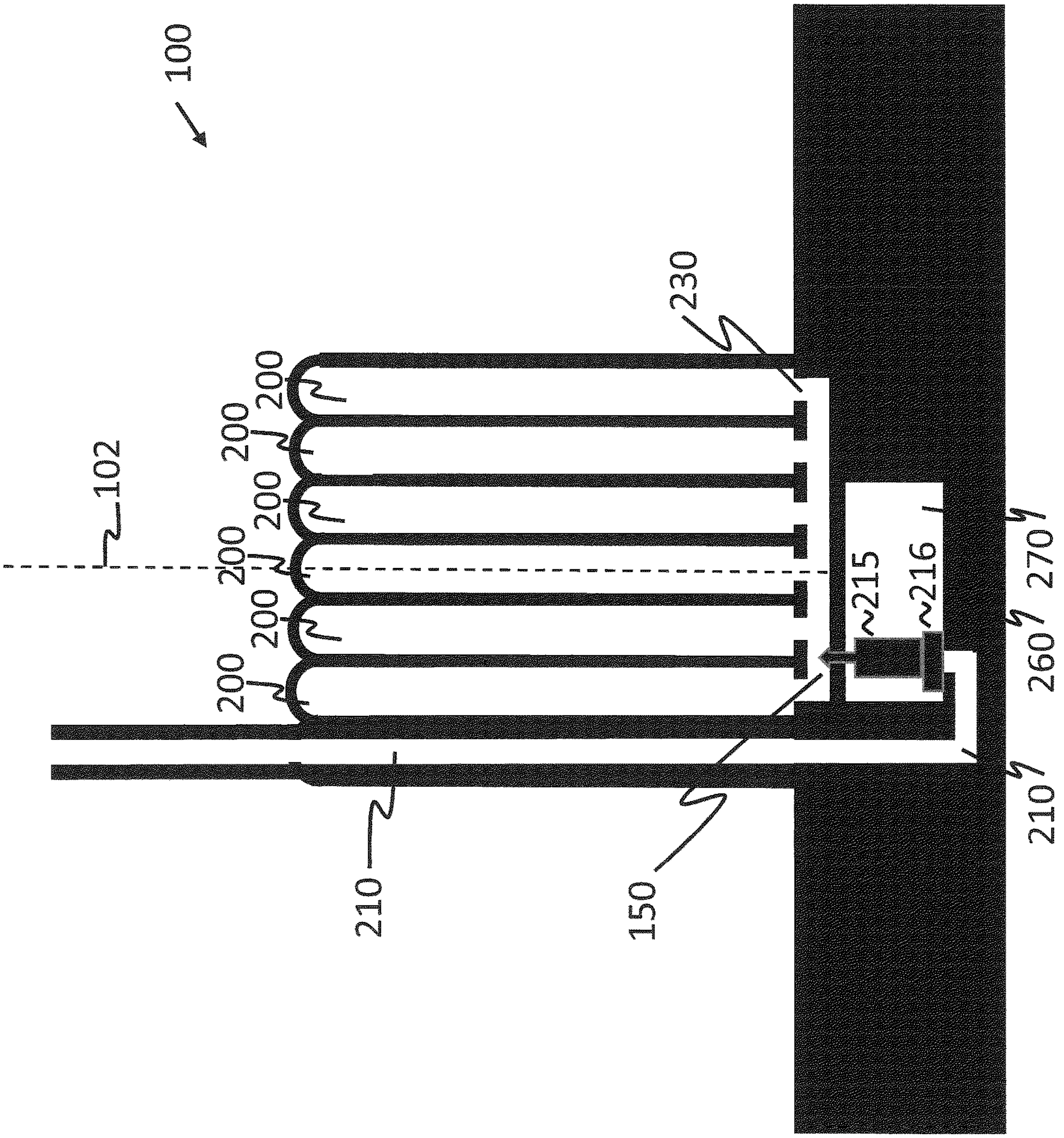
FIG. 8 is a side view showing a pressure vessel module with an access path.

FIG. 8 shows an alternative design, of a pressure vessel module 100 with a foundation 260 into which the reinforced cavity 210 extends. The pump turbine 215 is again located between the cavity 210 and the flow opening 150. Furthermore, an access path 270 is provided, in particular under or in the foundation 260, e.g. for maintenance services on the pump turbine 215, inspection walks and/or in case of repair or cleaning in the bottom plate. The access path may be designed to be large enough to allow replacement of the pump turbine 215 by means of (possibly special) trucks. In other words, dry access to the pump turbine 215 may be provided as in salt mines or even within dam walls.

For the production of a pressure vessel module 100, the foundation 260 can be built first, if necessary with accesses for maintenance and inspection services (in some cases also possible by video cameras), and then the outer wall 110 and the wall elements 220, i.e. the tubes, can be erected in a concreting process with slip forming technology in one working step. This technique also allows, if required, different concrete quality or even metal parts or plastics to be processed at the corresponding points.

With the present disclosure, as described, in particular the amount of concrete to be processed can be noticeably reduced. In the event that the dead weight of a module 100 is too low to compensate for buoyancy, the completed module can be weighted down with stones or earth, for example. Further, the module may be anchored to the ground. Furthermore, buoyancy forces can be prevented by the concrete shape of the whole module 100, in particular by a cylindrical geometry.

Figures 9A, 9B:
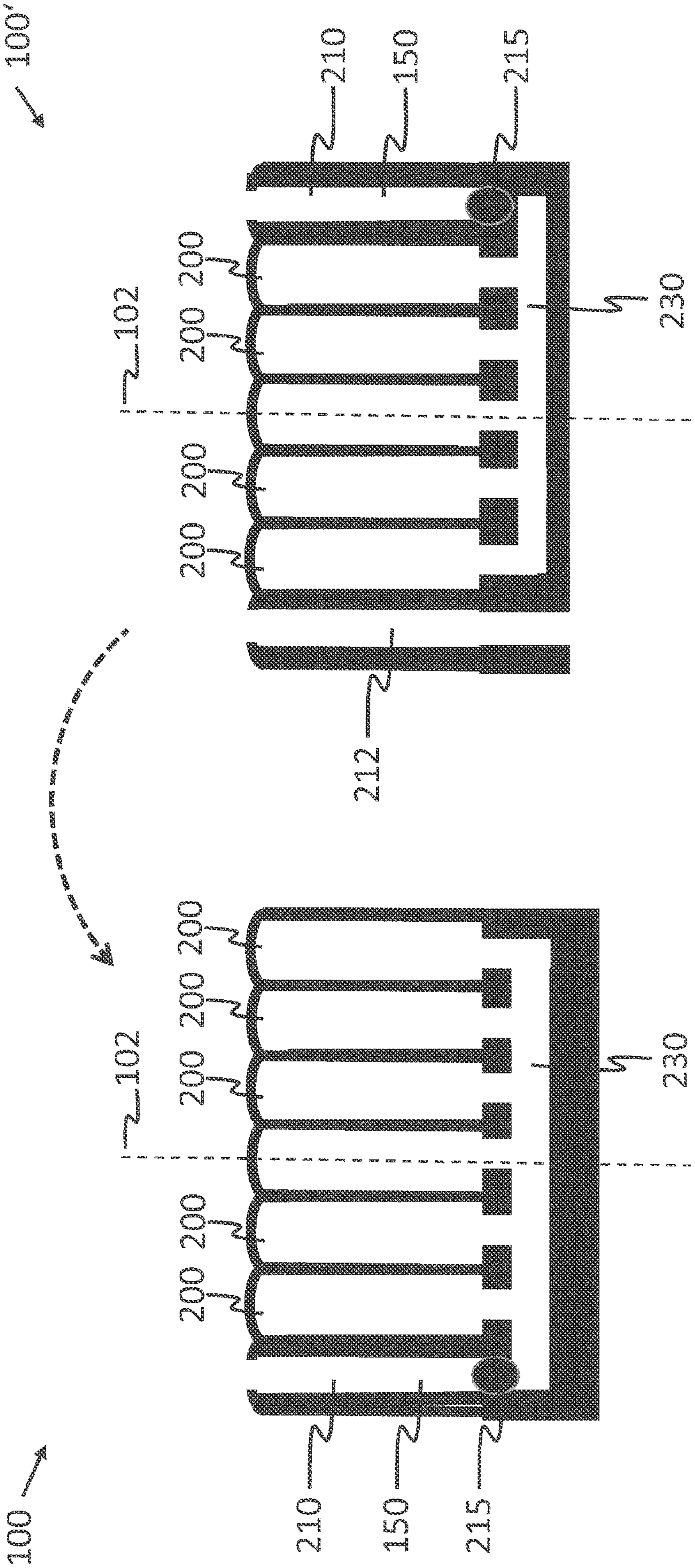
FIG. 9*a* is a side view of a stackable pressure vessel module shown in section.
FIG. 9*b* is a side view of a stackable pressure vessel module shown in section with a through opening.
Figure 10:
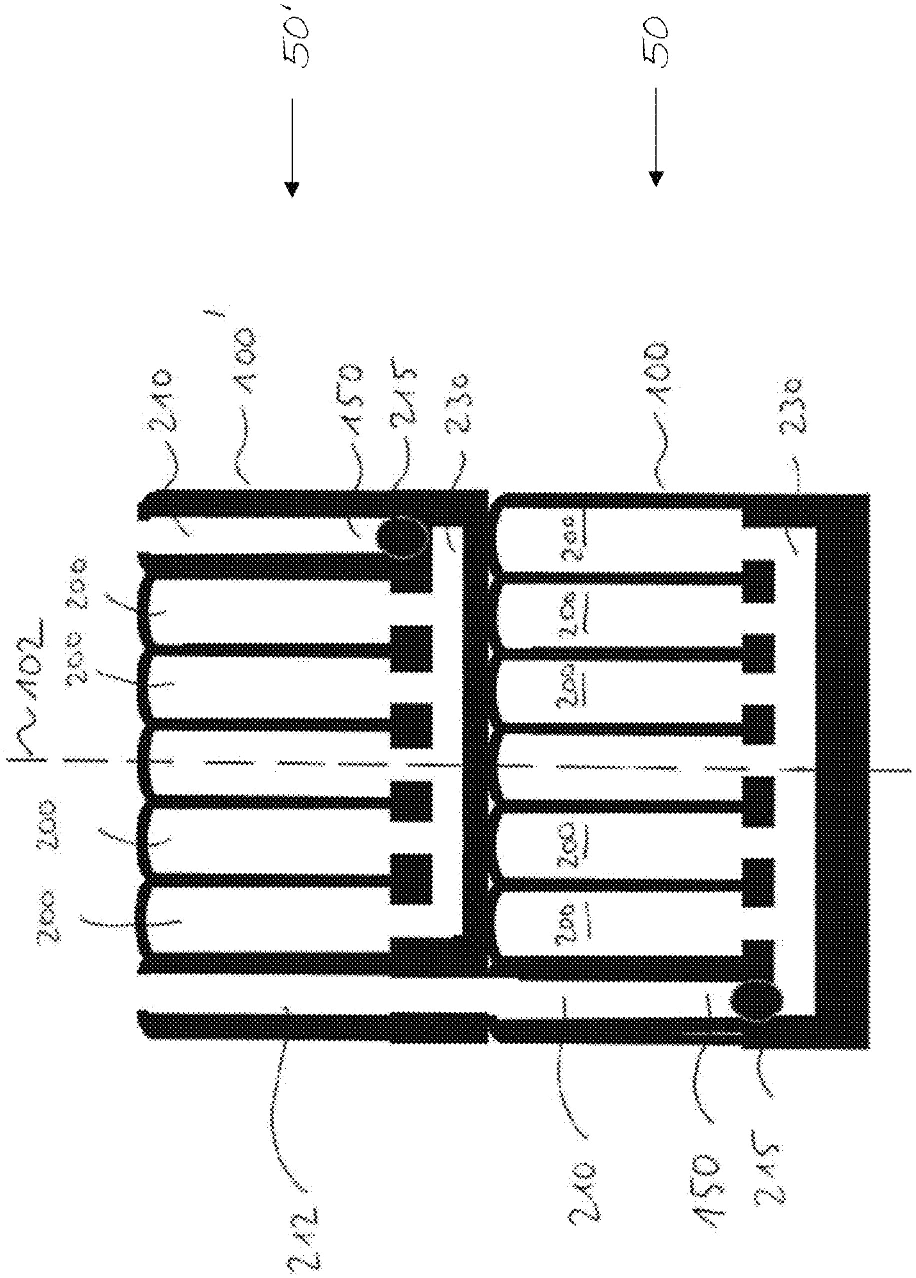
FIG. 10 is a side view of two stacked pressure vessel modules shown in section according to FIGS. 9*a* and 9*b*.
Figure 11:
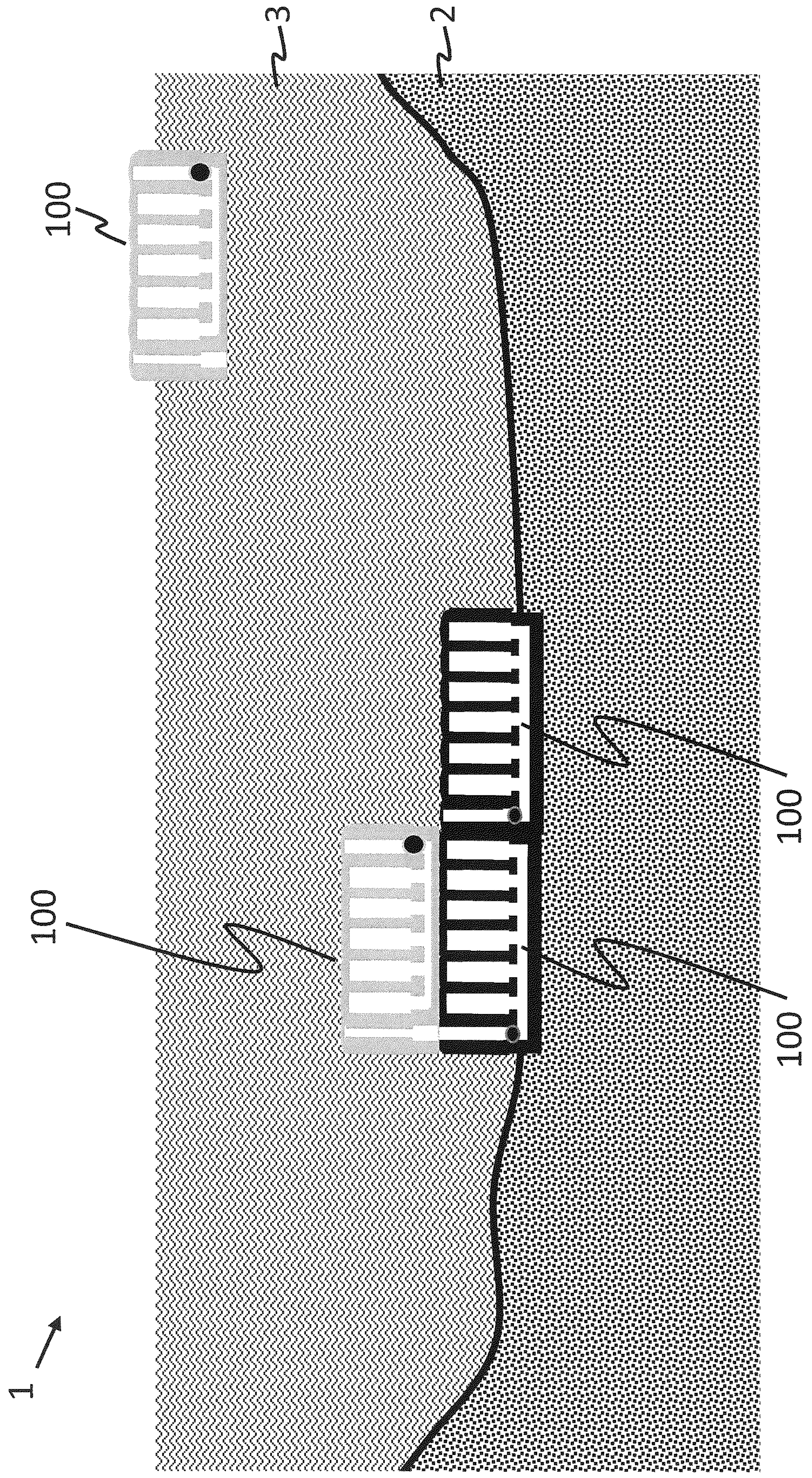
FIG. 11 is a side view of a flooded ground depression shown in section with two pressure vessel modules arranged on the subsoil, a pressure vessel module lowered thereon, and a floating pressure vessel module.

Referring to FIGS. 9 to 11, a modular design of a UW-PSPP reservoir 10 or an extension of a UW-PSPP reservoir 10 can also be performed if the ground depression 1 is already flooded or filled with water 3.

For this purpose, a pressure vessel module 100 may be manufactured in a dock as a floating body. For this purpose, the height of the module 100 (and the tubes) may be calculated so that the module 100 remains buoyant and can be floated on the surface of the water 3 to other locations, where it can be made to sink by water inflow, so that it sinks exactly at a desired location, in order to form an arrangement of pressure vessel modules 100 for a reservoir 10 on the bottom 2 of the bottom recess 1 there, or to expand an existing reservoir 10 (see FIG. 11).

As can be seen in FIG. 9*a*, the pump turbine 215 can again be appropriately sunk through the tube 210 and connected to the system. The full water pressure of the flooded lake (e.g. 45 bar at 450 m depth) reaches the pump turbine through tube 210. FIG. 9*b* now shows a pressure vessel module 100' which has a through cavity 212, which is arranged in particular in a corner of a polygonal module 100, as is the reinforced cavity 210. The module 100' shown in FIG. 9*b* can now be placed on top of a module 100 shown approximately in FIG. 9*a*, in particular by lowering it into the already flooded bottom cavity (see FIG. 10). Guide rods or rails may be provided on the modules to ensure precise arrangement one above the other. Further, two or more modules 100' may also be stacked on a lower module 100. Accordingly, it may be provided that another upper pressure vessel module layer 50' is arranged on top of the lower layer 50. Further, a third and possibly more layers may also be placed on top so that full use can be made of the depth of the lake.

Preferably, the cavity 210 of the lower module 100 is connected to the through cavity 212 of the upper module 100', so that in particular the turbine access and the water access on the high pressure side of the lower modules are kept free. For this purpose, the upper module 100' can be rotated by an angle depending on the polygon symmetry, such as 360/n=60 degrees for a hexagonal shape with n=6 corners. A lowering and, if necessary, stacked construction of modules can be used in particular already in flooded lakes or seas to build a UW-PSPP.

The present disclosure enables in particular the construction of pressure vessel modules 100 and/or a reservoir 10 with a low expenditure of construction material, since only outer tubes of a module or, if necessary, even only the outer tubes of a gapless arrangement are exposed to the water pressure. (as well as the lids of the tubes). By segmenting and arranging them adjacent to each other, the usable volume for storage can be optimized. If necessary, buoyancy can be compensated by weighting with excavated earth. The present disclosure allows the construction of a pumped storage power plant in open pit mines in such a way that the pumped storage power plant remains completely invisible after flooding to the lake, so that the flooded lake can be used as a recreational area. Furthermore, pumped storage power plants of almost gigantic size (in the Hambach open pit mine, for example, approx. 400 GWh for one filling cycle) can be built, whereby these are preferably erected in an open pit mine on the floor of the open pit site in order to achieve the greatest possible water pressure head, which also reduces the pressure fluctuation at the turbine by less than 40%. In particular, the modularity may allow the arrangement of many (in the Hambach open pit, for example, up to about 500 or even more) independently and water-separated turbine units, which have such a large capacity that sufficient short-term storage capacity (total capacity, for example, about 100 GW) can be provided to technologically enable an energy turnaround, e.g. in Germany.

It will be apparent to those skilled in the art that the embodiments described above are to be understood as exemplary, and the present disclosure is not limited to them, but can be varied in a variety of ways without departing from the present disclosure.

The invention claimed is:

1. An underwater pumped storage power plant reservoir in a dry ground depression, comprising:

a modular arrangement of several individual pressure vessel modules, wherein the pressure vessel modules each have an outer wall with at least one flow opening for letting in and/or letting out water and are configured for independent operation such that the pressure vessel modules can each be filled with water independently and/or pumped empty independently when the ground depression is flooded with water, and wherein the modular arrangement of the pressure vessel modules is configured in such a way that the pressure vessel modules are arranged with respect to one another in the dry ground depression with their outer wall being face-to-face adjacent to one another.

2. The underwater pumped storage power plant reservoir according to claim 1, wherein the pressure vessel modules each define a longitudinal direction, such that the outer wall of the pressure vessel modules each comprises an outer jacket surface surrounding the longitudinal direction, and/or wherein the pressure vessel modules are cylindrical at least over a portion of their longitudinal extent along their longitudinal direction, in such a way that the outer jacket surface has a constant shape in cross section, along the portion of their longitudinal extent along their longitudinal direction, and/or wherein the pressure vessel modules have a constant cross-sectional shape at least over the portion of their longitudinal extent along their longitudinal direction, and/or wherein the portion amounts to at least 25 percent of their longitudinal extent along their longitudinal direction.

3. The underwater pumped storage power plant reservoir according to claim 2, wherein the modular arrangement of the pressure vessel modules is configured in such a way that each pressure vessel module adjoins at least one other of the pressure vessel modules with at least 5 percent of its outer surface area, and wherein the modular arrangement of the pressure vessel modules is designed in such a way that at least some of the pressure vessel modules adjoin at least one other of the pressure vessel modules face-to-face with at least 75 percent of their outer surface area or their outer jacket surface area, and/or at least some of the pressure vessel modules arranged in an interior of the modular arrangement adjoin other of the pressure vessel modules face-to-face over the whole surface.

4. The underwater pumped storage power plant reservoir according to claim 2, wherein outer surfaces of the pressure vessel modules, or outer jacket surfaces of the pressure vessel modules, comprise planar surface sections, and wherein the planar surface sections of some of the pressure vessel modules adjoin planar surface sections of other of the pressure vessel modules in a face-to-face manner, and/or wherein the pressure vessel modules have, at least in sections, a substantially regularly polygonal cross-section with n corners, or a regularly hexagonal cross-section with n=6 corners.

5. The underwater pumped storage power plant reservoir according to claim 4, wherein the pressure vessel modules are arranged with their outer wall face-to-face adjacent to each other in such a way that each pressure vessel module faces, with an area of its outer surface, an area of an outer surface of at least one other of the pressure vessel modules, in such a way that between adjacent areas of the outer surfaces of the pressure vessel modules no gap remains or a gap remains which is smaller than 2% of the longitudinal extent of the pressure vessel module, and/or wherein the face-to-face adjacent part of the outer surface, or of the outer jacket surface, of each pressure vessel module and/or the adjoining planar surface sections of the pressure vessel modules, or of the outer jacket surface of the pressure vessel modules, adjoin one another in such a way that no gap remains therebetween or a gap remains which is smaller than 2% of the longitudinal extent of the pressure vessel module, and/or wherein a remaining gap is at least partially filled with a sealing material in order to prevent water from penetrating into the gap.

6. The underwater pumped storage power plant reservoir according to claim 1, wherein the modular arrangement of the pressure vessel modules is configured such that the pressure vessels form a regular grid, and/or wherein the modular arrangement of the pressure vessel modules forms a pressure vessel module layer lying directly on the ground, and further forms one or more upper pressure vessel module layers lying thereabove, and wherein the pressure vessel modules of the upper pressure vessel module layers are each arranged without offset above the respective pressure vessel modules of the pressure vessel module layer lying on the ground and are rotated relative thereto about their respective longitudinal axes.

7. The underwater pumped storage power plant reservoir according to claim 1, wherein the modular arrangement comprises at least 3 pressure vessel modules, and wherein the pressure vessel modules are formed identically.

8. The underwater pumped storage power plant reservoir according to claim 1, wherein the pressure vessel modules have in their interior a pressure guide structure, formed monolithically with the outer wall, and wherein the pressure guide structure comprises struts connecting inner surfaces of the outer wall and/or comprises arc-shaped or round-shaped surface portions of the inner surfaces of the outer wall.

9. The underwater pumped storage power plant reservoir according to claim 1, wherein the pressure vessel modules comprise, in a cross-section, a plurality of cavities with wall elements located therebetween, wherein the cavities are cylindrical and extend along a longitudinal direction of the pressure vessel modules.

10. The underwater pumped storage power plant reservoir according to claim 9, wherein the plurality of cylindrical cavities, in a cross-section, form a regular grid, and/or wherein a plurality of outer cavities adjacent to the outer wall annularly surround one or more inner cavities.

11. The underwater pumped storage power plant reservoir according to claim 9, wherein struts connecting inner surfaces of the outer wall and/or wall elements located between inner cavities are thinner than wall elements located between outer cavities and/or are thinner than the outer wall of the pressure vessel modules.

12. The underwater pumped storage power plant reservoir according to claim 9, wherein the cavities are interconnected by one or more connecting channels to form a common pressure storage volume, and/or wherein one of the cavities is opened outwardly, to form the flow opening for letting in and/or letting out water, and wherein the cavity forming the flow opening has a thicker wall thickness than the other cavities.

13. The underwater pumped storage power plant reservoir according to claim 9, wherein the pressure vessel modules are each provided with a turbine and a pump, or a pump turbine, at their flow opening so that when the ground depression is flooded with water, the underwater pumped storage power plant reservoir can be operated in such a way that via the turbine and the pump, or via the pump turbine, electrical energy is generated when water is let in from the flooded ground depression into the pressure vessel modules and electrical energy is used when water is let out from the pressure vessel modules into the flooded ground depression for energy storage, and wherein the turbine and the pump, or the pump turbine, is located inside of the cavity forming the flow opening.

14. An underwater pumped storage power plant in a flooded ground depression, comprising the underwater pumped storage power plant reservoir according to claim 1 at a bottom of the flooded ground depression.

15. A pressure vessel module, for modular arrangement with at least one other pressure vessel module and independent operation therefrom, in a dry ground depression and/or for sinking in an already flooded ground depression, comprising:

an outer wall having at least one flow opening for letting in and/or letting out water, such that the pressure vessel module can be filled with water independently of the at least one other pressure vessel module and/or pumped empty independently of the at least one other pressure vessel module when the ground depression is flooded with water, wherein the pressure vessel module is provided with its own turbine and pump, or its own pump turbine, separate from any turbine, pump, or pump turbine of the at least one other pressure vessel module, wherein the pressure vessel module defines a longitudinal direction in such a way that the outer wall of the pressure vessel module has a jacket surrounding the longitudinal direction with an outer jacket surface, and/or wherein the pressure vessel module is formed cylindrically at least over a portion along its longitudinal direction, such that the outer jacket surface along the portion of the longitudinal direction has a constant cross-sectional shape, and/or wherein the pressure vessel module has a constant cross-sectional shape at least over the portion of the longitudinal direction, and/or wherein the portion amounts to at least 25 percent of a longitudinal extent of the pressure vessel module.

16. The pressure vessel module according to claim 15, wherein the pressure vessel module is shaped in such a way that the outer wall of the pressure vessel module can be arranged face-to-face adjacent, to one or more further identically formed pressure vessel modules.

17. The pressure vessel module according to claim 15, wherein the outer surface of the pressure vessel module, or the outer jacket surface of the pressure vessel module, comprises planar surface sections or consists of planar surface sections, and/or wherein the pressure vessel module has, at least in sections, a substantially regularly polygonal cross-section with n corners, or a regularly hexagonal cross-section with n=6 corners.

18. A pressure vessel module, for modular arrangement with at least one other pressure vessel module and independent operation therefrom, in a dry ground depression and/or for sinking in an already flooded ground depression, comprising:

an outer wall having at least one flow opening for letting in and/or letting out water, such that the pressure vessel module can be filled with water independently of the at least one other pressure vessel module and/or pumped empty independently of the at least one other pressure vessel module when the ground depression is flooded with water, wherein the pressure vessel module has in an interior thereof a pressure guide structure, formed monolithically with the outer wall, wherein the pressure guide structure comprises struts connecting inner surfaces of the outer wall and/or arc-shaped or round-shaped surface portions of the inner surfaces of the outer wall.

19. A pressure vessel module, for modular arrangement with at least one other pressure vessel module and independent operation therefrom, in a dry ground depression and/or for sinking in an already flooded ground depression, comprising:

an outer wall having at least one flow opening for letting in and/or letting out water, such that the pressure vessel module can be filled with water independently of the at least one other pressure vessel module and/or pumped empty independently of the at least one other pressure vessel module when the ground depression is flooded with water, wherein the pressure vessel module comprises, in a cross-section, a plurality of cavities with wall elements located therebetween, wherein the cavities are cylindrical and extend along a longitudinal direction of the pressure vessel module.

20. The pressure vessel module according to claim 19, wherein the plurality of cylindrical cavities, in a cross-section, form a regular grid, or according to a structure of a hexagonal axis system, and/or wherein a plurality of outer cavities adjacent to the outer wall annularly surround one or more inner cavities.

21. The pressure vessel module according to claim 19, wherein struts connecting inner surfaces of the outer wall and/or wall elements located between inner cavities are thinner than wall elements located between outer cavities and/or are thinner than the outer wall of the pressure vessel module.

22. The pressure vessel module according to claim 19, wherein the cavities are interconnected via connecting channels to form a common pressure storage volume, and/or wherein one of the cavities, or a cavity arranged in a corner of a pressure vessel module of substantially regular polygonal shape in cross-section, is opened outwardly, or upwardly, to form the flow opening for letting in and/or letting out water, and wherein the cavity forming the flow opening has a thicker wall thickness than other of the cavities.

23. The pressure vessel module according to claim 19, wherein the pressure vessel module is provided with a turbine, pump, and/or pump turbine at its flow opening, such that when the ground depression is flooded with water, the pressure vessel module can be operated in such a way that electrical energy is generated when water is let into the pressure vessel module from the flooded ground depression, and electrical energy is stored when water is let out of the pressure vessel module into the flooded ground depression, and wherein the turbine, pump and/or pump-turbine is arranged inside the cavity forming the flow opening, or at the lower end thereof.

24. The pressure vessel module of claim 15, wherein the at least one other pressure vessel module is in a modular arrangement with one another and independent operation from one another, each of the at least one other pressure vessel module can be filled with water and/or pumped empty independently of each other when the ground depression is flooded with water.

* * * * *